May 26, 1936. W. J. BRETH ET AL 2,041,990
TIRE BUILDING MACHINE
Filed Sept. 4, 1931 2 Sheets-Sheet 1

INVENTOR
Walter J. Breth & May L. Engler
BY
Evans & McCoy
ATTORNEYS

May 26, 1936.  W. J. BRETH ET AL  2,041,990
TIRE BUILDING MACHINE
Filed Sept. 4, 1931   2 Sheets-Sheet 2
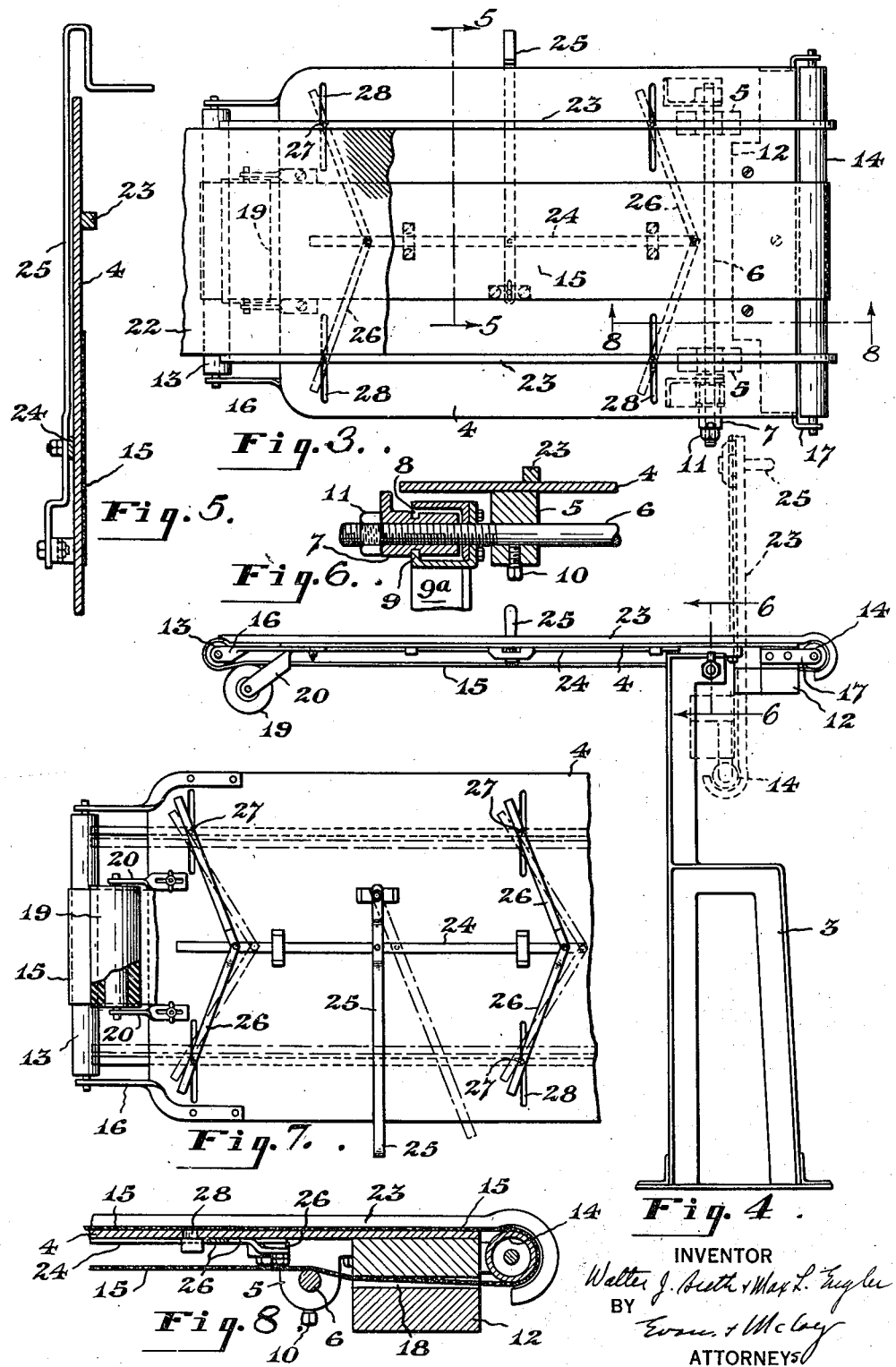

Patented May 26, 1936

2,041,990

UNITED STATES PATENT OFFICE 2,041,990

TIRE BUILDING MACHINE

Walter J. Breth and Max L. Engler, Akron, Ohio, assignors to The General Tire & Rubber Company, Akron, Ohio, a corporation of Ohio Application September 4, 1931, Serial No. 561,096

7 Claims. (Cl. 154—10)

This invention relates to tire building machines, and more particularly to machines of the drum type.

One of the objects of the present invention is to provide a tire building machine of such new and improved construction that tire casings can be built thereon more economically and in a shorter time than has been heretofore possible.

Another object is to provide a tire building machine wherein the elements used in building up the tire carcass may be easily and accurately fed to the tire building drum with a minimum of manual labor.

Another object is to provide a tire building machine with a ply feeding apparatus operated by the tire assembly drum, wherein the fabric plies may be accurately fed to the drum.

With the above and other objects in view which will be apparent from the detailed following description, the present invention consists in certain features of construction and combinations of parts which will be readily understood by those skilled in the art to which the invention appertains.

In the drawings which illustrate a suitable embodiment of the tire building machine of the present invention, Figure 1 is a plan view of the complete tire building machine;

Fig. 3 is a plan view of the ply feeding apparatus;

Fig. 4 is a side elevation of the ply feeding apparatus shown in Fig. 3;

Fig. 5 is an enlarged section taken substantially on the line 5—5 of Fig. 3;

Fig. 6 is an enlarged section taken substantially on the line 6—6 of Fig. 4, showing the means for pivoting the ply feeding table to the supporting standard;

Fig. 7 is a fragmentary bottom view of the ply feeding apparatus; and

Fig. 8 is an enlarged section taken substantially on the line 8—8 of Fig. 3.

Figure 1:
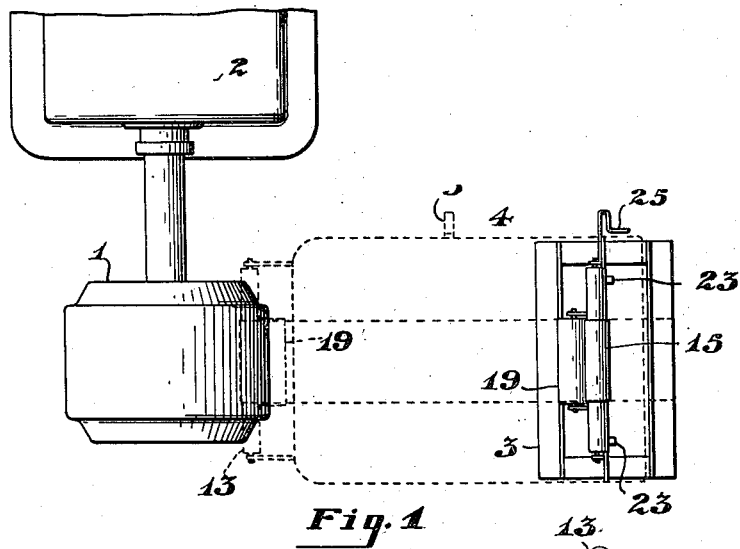

Referring to the accompanying drawings in which like numerals refer to like parts throughout the several views, the rotatable drum 1 on which the tire carcass is constructed may be of any suitable type and is mounted for rotation in either direction on a suitable standard 2.

A suitable frame 3 positioned forwardly of and in spaced relation to the drum 1 supports the feeding means for the fabric plies that go to make up the body of the tire carcass. The ply feeding apparatus, as more clearly illustrated in Figs. 3 to 8, inclusive, comprises a flat table 4 having a pair of brackets 5 secured to the under side thereof near one end. These brackets 5 carry a support rod 6 which extends therethrough and through the side pieces of the supporting frame 3. One end of the support rod 6 has a suitable adjusting nut 7 threaded thereon, which is formed with a circumferential groove 8. The groove 8 engages with an upstanding flange 9 formed on a bracket 9ª secured to the side member of the supporting frame in order to hold the table against substantial transverse movement, and permit of bodily lateral adjustment of the table relative to the assembly drum 1. The support rod 6 is held against rotation relative to the table 4 by means of suitable set screws 10 threaded into the brackets 5. The nut 7 is held against inadvertent threading on the rod 6 by a suitable lock nut 11. A balancing weight 12 is secured to the under side of the table at its forward end, which tends to maintain the table in its vertical position. The ply feeding apparatus, when in use, is pivoted to the horizontal position shown in dotted outline in Fig. 2 and in solid outline in Fig. 4.

Transversely extending rollers 13 and 14 are secured to opposite ends of the ply feeding device, over which an endless apron 15 is arranged to operate. The rearward roller 13 is rotatably mounted on suitable brackets 16 secured to the under side of the table, and the forward roller 14 is secured by brackets 17 to the counterweight 12. The endless apron 15 is so arranged that its upper side lies flat on the table 4, and its lower side passes over the support rod 6 and thence through an elongated slot 18 formed in the counterweight 12. It will be noted that the top surface of the support rod 6 is above the plane of the slot 18, the effect of which is to create a slight friction between the apron and the rod 6 and between one of the slot walls 18 in order to prevent too much freedom of movement of the endless apron 15. The slot 18 also guides the endless apron 15 and prevents substantial lateral traveling of the same on the rollers 13 and 14.

The apron 15 is operated by the tire building drum 1 through the medium of a driving roll 19 which is adjustably secured to the table 4 by suitable brackets 20. The driving roll 19 is mounted forwardly of the rearmost roller 13 to contact with the lower side of the apron, and is arranged to create tension in the apron. In order to provide slipless driving contact between the driving roll 19 and the apron, and the driving roll and the drum 1 or the tire carcass partially assembled thereon, the roll 19 is preferably formed with a surface covering of rubber or some suitable material that will propel the apron 15 without slippage.

Figure 2:
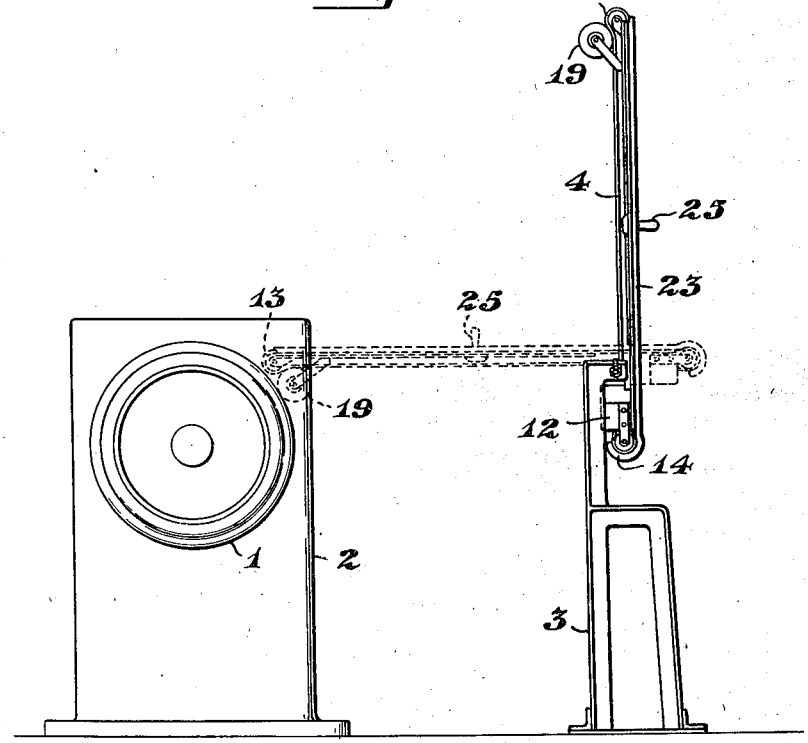
Fig. 2 is a side elevation of the machine shown in Fig. 1.

In operation, the operator pivots the table 4 to its horizontal position, as shown in dotted outline in Figs. 1 and 2, so that the drive roll 19 will bear against the drum 1 or the tire carcass partially formed thereon. The operator then causes the drum to rotate in a counter-clockwise direction, as viewed in Fig. 1, which causes the upper side of the feed apron 15 to travel toward the drum 1, and he then places the fabric plies to be applied on the apron 15 which moves the same toward the drum 1, the peripheral rate of the drum being substantially the same as the rate of travel of the apron 15.

The fabric ply such as the ply 22 indicated in Fig. 3, being fed to the drum, is guided into a centered position on the apron 15 by means of side guides 23 carried by the table 4. These guides are arranged to be moved outwardly at the will of the operator so that the fabric plies of different width may easily be placed on the feed apron in properly centered position. The side guides 23 are simultaneously movable and are actuated by a suitable lever arrangement such as that illustrated in Figs. 4, 5 and 7.

In the lever arrangement shown in the drawings, a suitable slide bar 24 is mounted on the under side of the table 4 intermediate the sides thereof to slide in a longitudinal direction. The bar 24 is actuated by a lever 25 having its one end extending beyond the edge of the table and its other end pivoted to the table 4. The lever 25 is pivoted intermediate its ends to the slide bar 24, and each end of the slide bar 24 has a pair of oppositely extending links 26 pivoted thereto which carry pivot pins 27 at their outer ends that extend upwardly through elongated slots 28 in the table 4 to carry the side guides 23.

It is thus obvious that the operator may simultaneously adjust the side guides 23 to accommodate any desired width of fabric ply by merely moving the actuating lever 25 which, through the slide bar 24 and attached links 26, causes the side guides to move inwardly or outwardly, as the case may be, in equal increments. Two positions of the side guides are indicated by the solid and dotted outlines shown in Fig. 7.

It is very essential in building tire carcasses that the fabric plies be properly centered when they are applied to the carcass. This is assured in the device of the present invention because the center lines of the ply feed apron 15 and drum 1 are arranged coincident with each other, the side guides 23 being equally spaced from the center line of the apron 15.

With the ply feed arrangement of the present invention, the uniformity of construction of the tire carcass is positively assured by reason of the accurate application of the fabric plies to the carcass.

The apparatus of the present invention presents many advantageous characteristics which tend toward an accurately constructed product.

In the apparatus described, the stock employed is conveniently arranged for easy, rapid and extremely efficient application to the carcasses being built, with the result that the finished products will be uniformly constructed.

Furthermore, it is to be understood that the particular forms of apparatus shown and described, and the particular procedure set forth, are presented for purposes of explanation and illustration and that various modifications of said apparatus and procedure can be made without departing from our invention as defined in the appended claims.

What we claim is:

1. In a tire building machine having a rotatable tire assembly drum, means for feeding fabric plies to said drum comprising a pivoted table, rollers mounted at the ends of said table, an endless apron mounted on said rollers and operatable over said table, a drive roll secured to said table and having continuous engagement with said apron, said drive roll being engageable with the rotatable assembly drum to thereby cause movement of said apron on said rollers to feed fabric plies to said drum, and means on said table for guiding the fabric plies and for positioning said plies centrally on said endless apron.

2. In a tire building machine having a rotatable tire assembly drum, means for feeding fabric plies to said drum, comprising a table, an endless ply supporting apron movable over said table, rotatable means for moving said apron to feed the plies supported thereon to said drum and in the direction of rotation of said drum, said rotatable means being driven by engagement with the tire being built on said drum, a support, and means for pivoting said table to said support whereby said table may be pivoted to bring said rotatable means into driving engagement with the tire being built on said drum.

3. In a tire building machine, the combination of a rotary tire-assembly drum, and a feed conveyor for delivering tire material in strip form thereto comprising an endless feed apron, spaced idle rollers carrying said apron, a roller directly engaging the return stretch of said apron and directly engageable with the drum or tire material thereon for driving the apron, and a frame carrying said idle and driving rollers and pivoted to swing the conveyor and bring the driving roller into and out of coaction with the drum.

4. In a tire building machine, the combination of a rotatable tire-assembly drum, and ply-material feeding means including an endless feed apron carried on spaced rollers, a driving roller engaging the return stretch of the apron and directly engageable with the drum or ply material thereon, a table interposed between the stretches of said apron for supporting its upper stretch, and laterally-adjustable edge guides carried by said table for centralizing the ply material on said apron.

5. In a tire building machine, the combination of a rotatable tire-assembly drum, and ply-material feeding means including an endless feed apron carried on spaced rollers, a driving roller engaging the return stretch of the apron and directly engageable with the drum or ply material thereon, a table interposed between the stretches of said apron for supporting its upper stretch, laterally-adjustable edge guides carried by said table for centralizing the ply material on said apron, and means common to said edge guides for simultaneously adjusting said guides.

6. In a tire building machine, the combination of a rotatable tire-assembly drum, and ply-material feeding means including an endless feed apron carried on spaced rollers, a driving roller engaging the return stretch of the apron and directly engageable with the drum or ply material thereon, a table interposed between the stretches of said apron for supporting its upper stretch, laterally-adjustable edge guides carried by said table for centralizing the ply material on said apron, and means common to said edge guides for simultaneously adjusting said guides, said adjusting means including spaced supports for each guide, said table having transversely extruding slots through which said guides extrude, a member longitudinally slidably mounted on the under side of said table, links pivoted to said slidable member and to said guide supports, and readily accessible means for sliding said member.

7. In a tire building machine, the combination of a rotary tire-assembly drum, and a feed conveyor for delivering tire material in strip form thereto comprising an endless feed apron, spaced idle rollers carrying said apron, a roller directly engaging the return stretch of said apron and directly engageable with the drum or tire material thereon for driving the apron, and a frame carrying said idle and driving rollers, a support, means disposed inwardly from one end of said frame and pivoted to said support to swing the conveyor and bring the driving roller into and out of coaction with the drum, and a weight on the end of said frame remote from said driving roller, said weight being of sufficient mass to cause said conveyor to assume an upright position when not in use.

WALTER J. BRETH.
MAX L. ENGLER.